US007623844B2

(12) United States Patent
Herrmann et al.

(10) Patent No.: US 7,623,844 B2
(45) Date of Patent: Nov. 24, 2009

(54) USER AUTHENTICATION SYSTEM AND METHOD

(75) Inventors: Mark E. Herrmann, Boston, MA (US); Steven N. Kane, Boston, MA (US); Stuart Roseman, Boston, MA (US); Jason Yanowitz, Cambridge, MA (US)

(73) Assignee: GameLogic, Inc., Waltham, MA (US)

( * ) Notice: Subject to any disclaimer, the term of this patent is extended or adjusted under 35 U.S.C. 154(b) by 533 days.

(21) Appl. No.: 10/793,656

(22) Filed: Mar. 4, 2004

(65) Prior Publication Data

US 2004/0248555 A1    Dec. 9, 2004

Related U.S. Application Data

(60) Provisional application No. 60/451,893, filed on Mar. 4, 2003.

(51) Int. Cl.
*H04M 1/66* (2006.01)
*H04M 11/00* (2006.01)

(52) U.S. Cl. .................. 455/411; 455/410; 455/418

(58) Field of Classification Search ............ 455/411, 455/410, 418, 556.1, 556.2; 379/93.02, 93.04, 379/142.05; 709/219, 206, 225; 726/6, 9
See application file for complete search history.

(56) References Cited

U.S. PATENT DOCUMENTS

| 5,716,273 | A  | * | 2/1998  | Yuen ........................... 463/29 |
| 6,360,254 | B1 |   | 3/2002  | Linden et al. |
| 6,609,978 | B1 | * | 8/2003  | Paulsen ....................... 463/42 |
| 7,022,017 | B1 | * | 4/2006  | Halbritter et al. ............. 463/42 |
| 7,142,840 | B1 | * | 11/2006 | Geddes et al. .............. 455/411 |
| 2001/0039616 | A1 |   | 11/2001 | Kumagai et al. |

FOREIGN PATENT DOCUMENTS

| WO | WO 01/99378 A1 | 12/2001 |
| WO | WO 02/27424 A2 | 4/2002 |
| WO | WO 02/37241 A2 | 5/2002 |
| WO | WO 03/107227 A2 | 12/2003 |

* cited by examiner

*Primary Examiner*—Melur Ramakrishnaiah
(74) *Attorney, Agent, or Firm*—Lando & Anastasi, LLP (57) ABSTRACT

The present invention relates to systems for and methods of authentication of a program user. More particularly, winning players of an interactive game program call a randomly selected phone number or access a randomly selected website that is displayed to them and additionally enter a randomly generated code also displayed to the viewer that a computer system then compares against its database and determines if the player is authentic.

115 Claims, 4 Drawing Sheets

USER AUTHENTICATION SYSTEM AND METHOD

RELATED APPLICATIONS

This application claims priority under 35 U.S.C. §119(e) to U.S. Provisional Application Ser. No. 60/451,893 entitled "USER AUTHENTICATION SYSTEM AND METHOD," filed on Mar. 4, 2003, which is herein incorporated by reference in its entirety.

FIELD OF THE INVENTION

The present invention generally relates to authentication, and more particularly, to authentication of a program user.

DESCRIPTION OF THE ART

Authentication of the identity of a user is generally a requirement for any program requiring security. Numerous user identity authentication methods have been developed and implemented. One common method for authenticating a user is implemented by automated teller machines (ATMs). A user swipes a card having a user number stored thereon at an ATM and then enters a personal identification number (PIN). If the PIN is correct for the user number, then the user may then proceed to perform transactions; otherwise, the user may be prompted to re-enter the PIN and/or may be locked out from performing any further functions on the ATM. The bank assigns a unique card number to a user and the user may choose the PIN associated with the card.

Similar systems are also used for telephone banking except that the identifying information is entered using the handset keypad. For example, a typical bank authenticates a telephone banking system user by asking for the user's social security number and his/her associated PIN.

Online providers such as Internet service providers, gaming sites and paid content providers often authenticate users by matching an input user identity with an input password. The user identity is unique for a specific website and is often chosen by the user; if a user requests an already assigned user identity, the website either suggests alternative user identities or requests the user to enter another one. The password is typically chosen by the user.

Individuals that purchase software are often required to enter the serial number and possibly an activation key for the specific purchased copy upon loading the software onto a computer. In this case, the serial number and/or activation key are chosen by the software developer.

European Patent Application No. 1120757A2 discloses a system that stores biometric information about a user on a card that can be read at a terminal. The terminal also has a system for checking the biometric information of a user to authenticate that he or she is the individual identified on the card.

Online credit card transactions authenticate the user by matching the credit card number, credit card expiration date and the exact credit cardholder name. Some systems may require additional information including mailing address, home phone number and work phone number. Additionally, a credit card number can often also be verified to be an actual credit card number by a card issuer because the last four digits are usually generated using an algorithm based upon the rest of the credit card numbers.

Numerous automatic user identity authentication methods have also been developed. Interactive television (iTV) systems authenticate a connected set top box (STB) using a specialized iTV system provider card that is kept plugged into the STB. Most iTV providers update the cards on an infrequent basis (e.g., every three years). An iTV system can provide more specific identification of a user by using a PIN lockout on the STB. Also, the use of a PIN lockout feature is usually user-determined.

Similarly, Internet content providers may also automatically authenticate a user through the use of a 'cookie' or file that is downloaded to a user's computer system and which is accessed when a user enters the Internet content provider's website.

SUMMARY OF THE INVENTION

There is a present and recurring need for new systems for and methods to authenticate a program user that is easy to use by a user, provides security and has changeable codes. Such systems and methods are needed for programs that have a constantly changing user base or access requirements.

According to one aspect of the invention, a method is provided for authenticating the identity of an individual at a remote viewing terminal. The method comprises acts of selecting a phone number, displaying the selected phone number to the individual on the viewing terminal, and authenticating the individual upon receipt of a call made by the individual to the selected phone number. In one embodiment of the invention, the method further comprises the act of displaying the selected phone number includes displaying the selected phone number upon an occurrence of activating event. In another embodiment of the invention, the method further comprises an act of maintaining the selected phone number as an active number for a period of time.

According to another aspect of the invention, a method is provided wherein the period of time is a time period of one game. In one embodiment of the invention, the period of time is a fixed period of time. In another embodiment of the invention, the period of time is a variable period of time. In another embodiment of the invention, the period of time allows for the individual to be authenticated.

In still another embodiment of the invention, the method further comprises an act of disabling the selected phone number after the period of time. In another embodiment of the invention, the act of displaying the selected phone number includes an act of displaying the selected phone number on one or more remote viewing terminals. In another embodiment of the invention, the act of displaying the selected phone number includes an act of displaying the selected phone number only at one remote viewing terminal. In another embodiment of the invention, the selected phone number is selected from a predetermined set of phone numbers. In another embodiment of the invention, the selected phone number is a toll-free number.

In one embodiment of the invention, a method is provided for an act of displaying a randomly-generated code to the individual viewing the viewing terminal. In another embodiment of the invention, a different randomly-generated code is displayed to each individual viewing on a remote viewing terminal. In another embodiment of the invention, the method further comprises an act of prompting the individual to enter a code. In another embodiment of the invention, the method further comprises acts of accepting the code from the individual and comparing the accepted code with a code displayed to the individual at the viewing terminal after calling the selected phone number.

In yet another embodiment of the invention, the randomly-generated code is active for a selected short time interval. In another embodiment of the invention, the method further comprises an act of conducting an interactive game played by the individual on the remote viewing terminal with a central computer system. In another embodiment of the invention, the activating event is a determination that the individual has won the game. In another embodiment of the invention, the method further comprises an act of determining whether the individual is a winner. In another embodiment of the invention, the method further comprises an act of notifying the individual if he or she is determined as a winner.

In another embodiment of the invention, a method is provided for authenticating the identity of an individual at a viewing terminal, comprises displaying a randomly-selected Internet site locator to the individual on the viewing terminal, and authenticating the individual upon access of the randomly-selected Internet site. In another embodiment of the invention, the method further comprises the act of displaying further comprises an act of displaying the randomly-selected Internet site locator upon an occurrence of an activating event. In another embodiment of the invention, the method further comprises an act of maintaining the randomly-selected Internet site locator as an active locator for a period of time.

In another embodiment of the invention, the period of time is a time period of one game. In another embodiment of the invention, the period of time is a variable period of time. In yet another embodiment of the invention, the period of time is a fixed period of time. In still another embodiment of the invention, the period of time allows for the individual to be authenticated.

In another embodiment of the invention, the method further comprises an act of disabling the selected phone number after the period of time. In another embodiment of the invention, the act of displaying the randomly-selected Internet site locator includes an act of displaying the randomly-selected site locator on one or more remote viewing terminals. In another embodiment of the invention, the act of displaying the randomly-selected Internet site locator includes an act of displaying the randomly-selected Internet site locator only at one remote viewing terminal.

In another embodiment of the invention, the randomly-selected Internet site locator is selected from a predetermined set of Internet site locators. In another embodiment of the invention, the randomly-selected Internet site locator is randomly-generated. In another embodiment of the invention, the method further comprises an act of displaying a randomly-generated code to the individual viewing the viewing terminal. In yet another embodiment of the invention, the method further comprises an act of prompting the individual to enter a code. In still another embodiment of the invention, the method further comprises acts of accepting the code from the individual and comparing the code with a code displayed to the individual at the viewing terminal after accessing the randomly-selected Internet site.

In another embodiment of the invention, the randomly-generated code is active for a selected short time interval. In another embodiment of the invention, the method further comprises an act of conducting an interactive game played by the individual on the remote viewing terminal with a central computer system. In another embodiment of the invention, the activating event is a determination that the individual has won the game. In another embodiment of the invention, the method further comprises an act of determining whether the individual is a winner. In another embodiment of the invention, the method further comprises an act of notifying the individual if he or she is determined as a winner. In another embodiment of the invention, the randomly selected Internet site is displayed on one or more of the remote viewing terminals.

According to another aspect of the invention, a computer-readable medium is provided having computer-readable signals stored thereon that when executed by a computer, perform a method for authenticating the identity of an individual at a remote viewing terminal, the method comprises selecting a phone number, displaying the selected phone number to the individual on the viewing terminal, and authenticating the individual upon receipt of a call made by the individual to the selected phone number.

In one embodiment of the invention, the act of displaying the selected phone number includes displaying the selected phone number upon an occurrence of activating event. In another embodiment of the invention, the method further comprises an act of maintaining the selected phone number as an active number for a period of time. In another embodiment of the invention, the period of time is a time period of one game. In yet another embodiment of the invention, the period of time is a fixed period of time.

In still another embodiment of the invention, the period of time is a variable period of time. In another embodiment of the invention, the period of time allows for the individual to be authenticated. In another embodiment of the invention, the method further comprises an act of disabling the selected phone number after the period of time. In another embodiment of the invention, the act of displaying the selected phone number includes an act of displaying the selected phone number on one or more remote viewing terminals. In another embodiment of the invention, the act of displaying the selected phone number includes an act of displaying the selected phone number only at one remote viewing terminal.

In another embodiment of the invention, the selected phone number is selected from a predetermined set of phone numbers. In another embodiment of the invention, the selected phone number is a toll-free number. In another embodiment of the invention, the method further comprises an act of displaying a randomly-generated code to the individual viewing the viewing terminal. In another embodiment of the invention, a different randomly-generated code is displayed to each individual viewing on a remote viewing terminal. In yet another embodiment of the invention, the method further comprises an act of prompting the individual to enter a code.

In another embodiment of the invention, the method further comprises acts of accepting the code from the individual and comparing the accepted code with a code displayed to the individual at the viewing terminal after calling the selected phone number. In another embodiment of the invention, the randomly-generated code is active for a selected short time interval. In another embodiment of the invention, the method further comprises an act of conducting an interactive game played by the individual on the remote viewing terminal with a central computer system. In another embodiment of the invention, the activating event is a determination that the individual has won the game. In another embodiment of the invention, the method further comprises an act of determining whether the individual is a winner. In another embodiment of the invention, the method further comprises an act of notifying the individual if he or she is determined as a winner.

According to another aspect of the invention, a computer-readable medium is provided having computer-readable signals stored thereon that when executed by a computer, perform a method for authenticating the identity of an individual at a viewing terminal. The method comprises displaying a randomly-selected Internet site locator to the individual on the viewing terminal, and authenticating the individual upon access of the randomly-selected Internet site. In another embodiment of the invention, the act of displaying further comprises an act of displaying the randomly-selected Internet site locator upon an occurrence of an activating event. In another embodiment of the invention, the method further comprises an act of maintaining the randomly-selected Internet site locator as an active locator for a period of time. In another embodiment of the invention, the period of time is a time period of one game. In another embodiment of the invention, the period of time is a variable period of time. In another embodiment of the invention, the period of time is a fixed period of time. In another embodiment of the invention, the period of time allows for the individual to be authenticated. In another embodiment of the invention, the method further comprises an act of disabling the selected phone number after the period of time.

In another embodiment of the invention, the act of displaying the randomly-selected Internet site locator includes an act of displaying the randomly-selected site locator on one or more remote viewing terminals. In another embodiment of the invention, the act of displaying the randomly-selected Internet site locator includes an act of displaying the randomly-selected Internet site locator only at one remote viewing terminal. In another embodiment of the invention, the randomly-selected Internet site locator is selected from a predetermined set of Internet site locators. In another embodiment of the invention, the randomly-selected Internet site locator is randomly-generated. In another embodiment of the invention, the method further comprises an act of displaying a randomly-generated code to the individual viewing the viewing terminal. In another embodiment of the invention, the method further comprises an act of prompting the individual to enter a code.

In yet another embodiment of the invention, the method further comprises accepting the code from the individual and comparing the code with a code displayed to the individual at the viewing terminal after accessing the randomly-selected Internet site. In another embodiment of the invention, the randomly-generated code is active for a selected short time interval. In another embodiment of the invention, the method further comprises conducting an interactive game played by the individual on the remote viewing terminal with a central computer system. In another embodiment of the invention, the activating event is a determination that the individual has won the game. In another embodiment of the invention, the method further comprises determining whether the individual is a winner. In another embodiment of the invention, the method further comprises notifying the individual if he or she is determined as a winner. In another embodiment of the invention, the randomly selected Internet site is displayed on one or more of the remote viewing terminals.

According to yet another aspect of the invention, a system is provided for authenticating the identity of an individual, the system comprises a selector that selects a phone number, a display adapted to display the selected phone number to the individual, and an authenticator adapted to authenticate the individual upon receipt of a call made by the individual to the selected phone number. In another embodiment of the invention, the display is adapted to display the selected phone number upon an occurrence of an activating event. In another embodiment of the invention, the system comprises means for maintaining the selected phone number as an active number for a period of time. In another embodiment of the invention, the period of time is a time period of one game. In yet another embodiment of the invention, the period of time is a fixed period of time. In yet another embodiment of the invention, the period of time is a variable period of time. In yet another embodiment of the invention, the period of time allows for the authenticator to authenticate the individual. In still another embodiment of the invention, the selector is adapted to disable the selected phone number after the period of time. In another embodiment of the invention, the display is part of a remote viewing terminal. In another embodiment of the invention, the selector is adapted to select the selected phone number from a predetermined set of phone numbers, the selected phone number is a toll-free number. In another embodiment of the invention, the display is adapted to display a randomly-generated code to the individual viewing the display.

According to another aspect of the embodiment, the display is adapted to display a different randomly-generated code to each individual viewing the display. In another embodiment of the invention, the method further comprises prompting the individual to enter a code. In yet another embodiment of the invention, the method further comprises accepting the code from the individual and means for comparing the accepted code with a code displayed to the individual on the display after calling the selected phone number. In yet another embodiment of the invention, the randomly-generated code is active for a selected short time interval. In still another embodiment of the invention, the method further comprises conducting an interactive game played by the individual at a remote viewing terminal including the display, the game being played with a central computer system. In another embodiment of the invention, the activating event is a determination that the individual has won the game. In another embodiment of the invention, the method further comprises determining whether the individual is a winner. In another embodiment of the invention, the method further comprises notifying the individual if he or she is determined as a winner.

According to another aspect of the present invention, a system is provided for authenticating the identity of an individual, wherein the system further comprises a display adapted to display a randomly-selected Internet site locator to the individual, and an authenticator adapted to authenticate the individual upon access of the randomly-selected Internet site. In another embodiment of the invention, the display is adapted to display the randomly-selected Internet site locator upon an occurrence of an activating event. In another embodiment of the invention, the method further comprises maintaining the randomly-selected Internet site locator as an active locator for a period of time. In another embodiment of the invention, the period of time is a time period of one game. In another embodiment of the invention, the period of time is a variable period of time. In yet another embodiment of the invention, the period of time is a fixed period of time. In yet another embodiment of the invention, the period of time allows for the individual to be authenticated.

In still another embodiment of the invention, the system further comprises disabling the selected phone number after the period of time. In another embodiment of the invention, the display is part of a remote viewing terminal. In another embodiment of the invention, the selector is adapted to select the site locator from a predetermined set of Internet site locators. In another embodiment of the invention, the randomly-selected Internet site locator is randomly-generated. In another embodiment of the invention, the display is adapted to display randomly-generated code to the individual viewing the display. In another embodiment of the invention, the system further comprises prompting the individual to enter a code. In another embodiment of the invention, the system further comprises accepting the code from the individual and means for comparing the code with a code displayed to the individual after accessing the randomly-selected Internet site. In another embodiment of the invention, the randomly-generated code is active for a selected short time interval.

In another embodiment of the invention, the system further comprises conducting an interactive game played by the individual on the remote viewing terminal with a central computer system. In another embodiment of the invention, the activating event is a determination that the individual has won the game. In another embodiment of the invention, the system further comprises determining whether the individual is a winner. In another embodiment of the invention, the system further comprises notifying the individual if he or she is determined as a winner. In another embodiment of the invention, the randomly selected Internet site is displayed on one or more remote viewing terminals.

The function and advantage of these and other embodiments of the present invention will be more fully understood from the examples described below. The following examples are intended to illustrate the benefits of the present invention, but do not exemplify the full scope of the invention.

DETAILED DESCRIPTION OF THE INVENTION

The present invention relates to systems for and methods of authentication of a program user. Some disadvantages of the existing user authentication systems include the following:

Automated authentication systems (i.e., authentication systems that do not have users that interact with set top boxes or other interactive television equipment) for interactive television do not distinguish individual users; they distinguish individual set top boxes.

Automated authentication systems for Internet content providers that employ 'cookies' downloaded to a computer for identifying users are also identifying the individual computer rather than the user. There may be computer systems in which a user has no account (e.g., a kiosk or betting terminal) and therefore, such authentication systems do not have methods for authenticating a user, either directly or indirectly by logging in a user into a user account. Therefore, identification of an individual user of a computer for an Internet content provider may not be possible and thus Internet content providers may have difficulty policing its users and enforcing policies.

The use of ATM cards or social security numbers or other user identities makes it difficult to change computer system access quickly—entry of such information is cumbersome, and this sometimes leads to the authentication system removing a user completely from the system.

According to various aspects of the invention, improved authentication methods are provided that overcome disadvantages of existing user authentication systems. According to several aspects of the invention, a user of a program may call a selected phone number or access a selected website address (or locator, e.g., URL) that is displayed to the user to authenticate him/her. According to one aspect of the invention, the phone number or website address is randomly selected from a group of numbers or addresses, respectively, and is displayed to a user. In another embodiment of the invention, a user may additionally enter a code (which may, for example, also be displayed to the user) that a computer system then compares against its data structure and determines if the player is authentic.

Various aspects of the invention may be implemented on a system having a terminal that may be viewed by a user. The user may view a program displayed on that terminal, and information used to validate the user may be provided to the user via the terminal. The program may be, for example, an interactive game that may be played online, off-line or on interactive television. The terminal may be a television, video terminal or computer monitor or other user interface described below. As used herein, a "user interface" or "UI" is an interface between a human user and a computer that enables communication between a user and a computer. Types of UIs include a graphical user interfaces (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Figure 1:
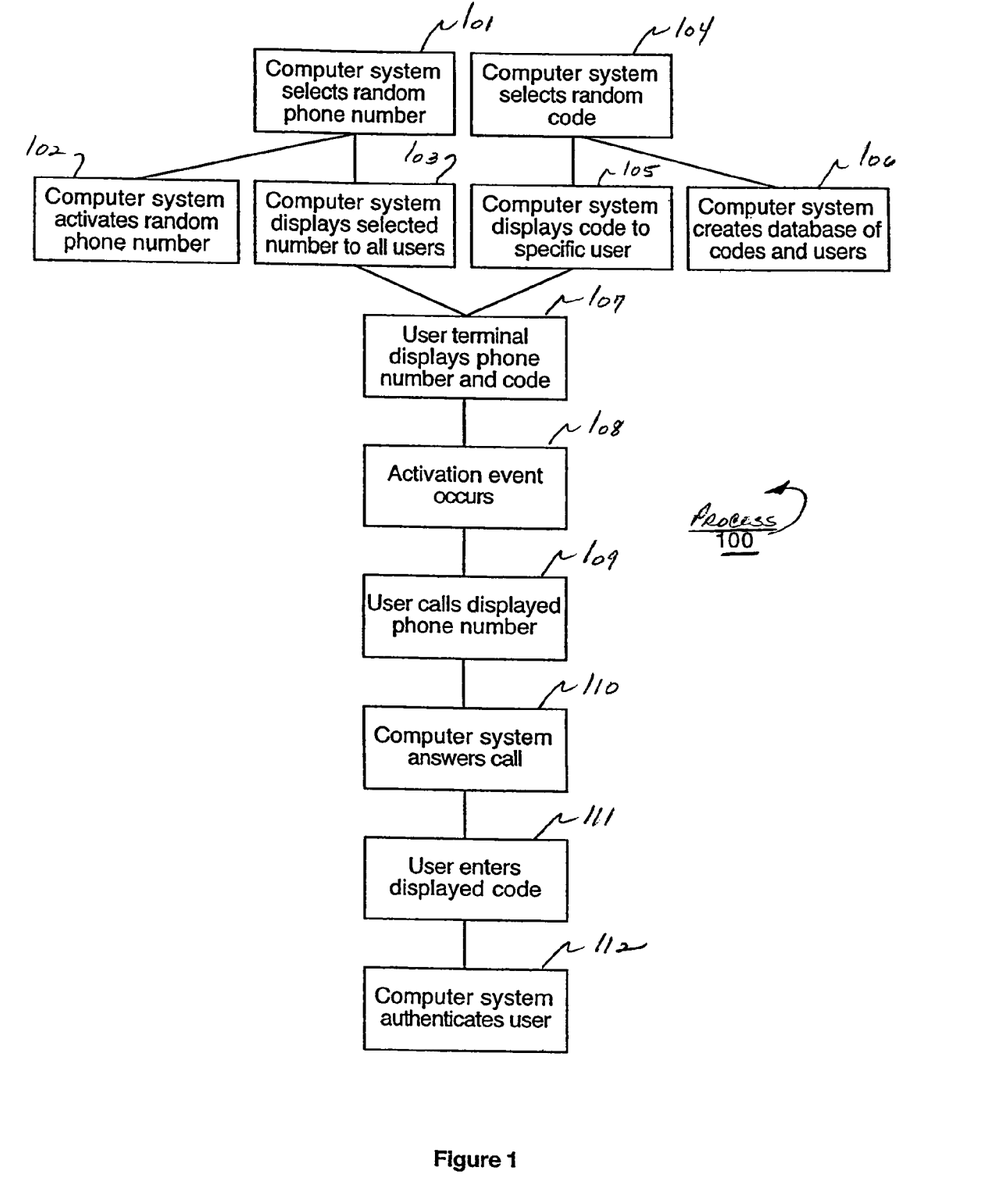
FIG. 1 is a flow chart of a process for performing the user authentication in accordance with one embodiment of the present invention.

FIG. 1 shows an example process for authenticating a user according to one embodiment of the present invention. Referring to FIG. 1, a computer system may select a telephone number that may be used to authenticate a user. This phone number may be chosen, for example, from a group of phone numbers, may be a randomized phone number, or may be chosen by some other method. The computer system may display this chosen telephone number to one, some or all viewers (e.g., at block 103). The chosen telephone number may, for example, be shown only to the game winner(s). Because the phone number may be shown only to the winner(s), a user that is a winner may be authenticated by the game operator by having the user calling the displayed number. As discussed, according to another embodiment of the invention, authentication may be desired that provides additional security by requiring the user to enter a code (e.g., a randomly-generated code) to gain access. Thus, the computer system may display a phone number and a code to the user at block 107.

The computer system may send the information (e.g., phone number, code) to the user interface by direct connection (e.g., the user interface is part of the computer system) or the information may be sent to another system through a network. As used herein, a "network" or a "communications network" is group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media. The phone number and/or code may be transmitted to the user over any type of network.

As discussed above, the chosen telephone number may be selected from a set (group or bank) of known telephone numbers. According to one embodiment, the number may be selected from a bank of toll-free telephone numbers. Other types of phone numbers may also be used including toll 900 numbers (in the United States) or other format. The computer system may also activate the randomly selected phone number to ring and to be answered. According to one aspect of the invention, a number may be activated for a finite amount of time. This amount of time may be, for example, a short period of time to allow a user to authenticate, but may be short enough for other unauthorized users from using the number at a later time.

In one aspect of the invention, a web address may be chosen instead of or in addition to a phone number. The web address may be chosen, for example, from a set of known web addresses. According to another embodiment, the web address may be randomly selected from the set. In yet another embodiment, the web address may be randomly generated without being known a priori.

As shown in FIG. 1, the computer system may also select a random code and display it to a specific viewer only (e.g., at blocks 104 and 105, respectively). A different random code may be selected and displayed to each viewer. Preferably, the random code is unique for each viewer. At block 106, the computer may store the codes and the user associated with each in a data structure. Alternatively, the computer system may select a random code and display the code only to a winner, with a different code being displayed to each winner. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Alternatively, the authentication code may be generated by an algorithm existing both on the computer system and on the set top box or user interface.

The code may be a randomly generated code or may be based upon an aspect of the user's information including name, address, age or phone number, game information including game time and date and/or any other information. The code may use any one of or combination of upper or lower case letters, symbols, numbers or computer keyboard or phone keypad keys. The computer system may choose the code in parallel or in series with the randomly selected phone number.

Once the computer system has sent the information, the user terminal may display the randomly-selected phone number displayed to one or more viewers. According to another embodiment, the computer system may display the user-specific random code to a specific user (e.g., a winning user). This information may be displayed for an indefinite period of time or may be displayed only for a well-defined time period. For example, the phone number and code may be displayed only for a few television shows or one game (e.g., a game following the winning game).

In some embodiments of the invention, the displayed information is not needed until an activating event occurs (e.g., at block 108). An activating event may be, for example, a question posted on a television screen for a viewer to answer or an indication of a game win.

When the activating event occurs, then the user may call the displayed phone number (or access the displayed web address) at block 109. At block 110, the computer system (or an operator) may answer the call. Once the call is answered, the user may or may not be prompted to enter the code displayed specifically to him or her. Then the user may enter the random code using a data entry means including a phone keypad or computer keyboard or voice at block 111.

When the code has been entered, the computer then determines the user to which the code was specifically assigned. If the code is a valid code, then the computer system (or operator) may then confirm the user identity at block 112.

Because the computer system (or operator) has positively identified the user, follow-up steps that required the secure access may be completed. In a game playing situation, this may be verifying that the user is a winner and determining the user's payout. An example authentication method and system that may be used to verify a winner is described in a co-pending U.S. patent application entitled "GAME OF CHANCE AND SYSTEM AND METHOD FOR PLAYING GAMES OF CHANCE," by M. Hermann et al., filed Jan. 30, 2004 under application Ser. No. 10/768,980 and a co-pending U.S. patent application entitled "GAME OF CHANCE AND SYSTEM AND METHOD FOR PLAYING GAMES OF CHANCE," by M. Hermann et al., filed Dec. 5, 2003 under application Ser. No. 10/729,826. It should be appreciated, however, that the invention is not limited to any particular verification system, and that other systems may be used.

As mentioned above, the randomly selected phone number may be active (and therefore valid) for only a short time period. When the time period ends, the randomly selected phone number may be deactivated and thus may not be available for use until the phone number is randomly selected again. The deactivation prevents an unauthorized user from authenticating using a previously used phone number (e.g., a phone number displayed to a valid winner or group of players and obtained by the unauthorized user whether as a previous winner, player or through other means (e.g., by observing a previous game)). Similarly, the random codes assigned to each user may also be erased and thus be no longer active (and therefore valid) for the user after a short time period.

The authentication process 100 may include additional acts and is not limited to the acts shown. Further, the order of the acts performed as part of process 100 is not limited to the order illustrated in FIG. 1 as the acts may be performed in other orders, and one or more of the acts of process 100 may be performed in series or in parallel to one or more other acts, or parts thereof. For example, activating the randomly selected phone number and displaying the selected number to players, or parts thereof, may be performed in parallel or in series, and the computer system may select a user-specific random code at any point during performance of process 100.

Process 100 is merely an illustrative embodiment of the method of user authentication. Such an illustrative embodiment is not intended to limit the scope of the invention, as any of numerous other implementations of the method of user authentication, for example, variations of 100, are possible and are intended to fall within the scope of the invention. None of the claims set forth below are intended to be limited to any particular implementation of the method of user authentication unless such claim includes a limitation explicitly reciting a particular implementation.

Process 100, acts thereof and various embodiments and variations of these processes and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of system 200 described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIGS. 3 and 4, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Figure 2:
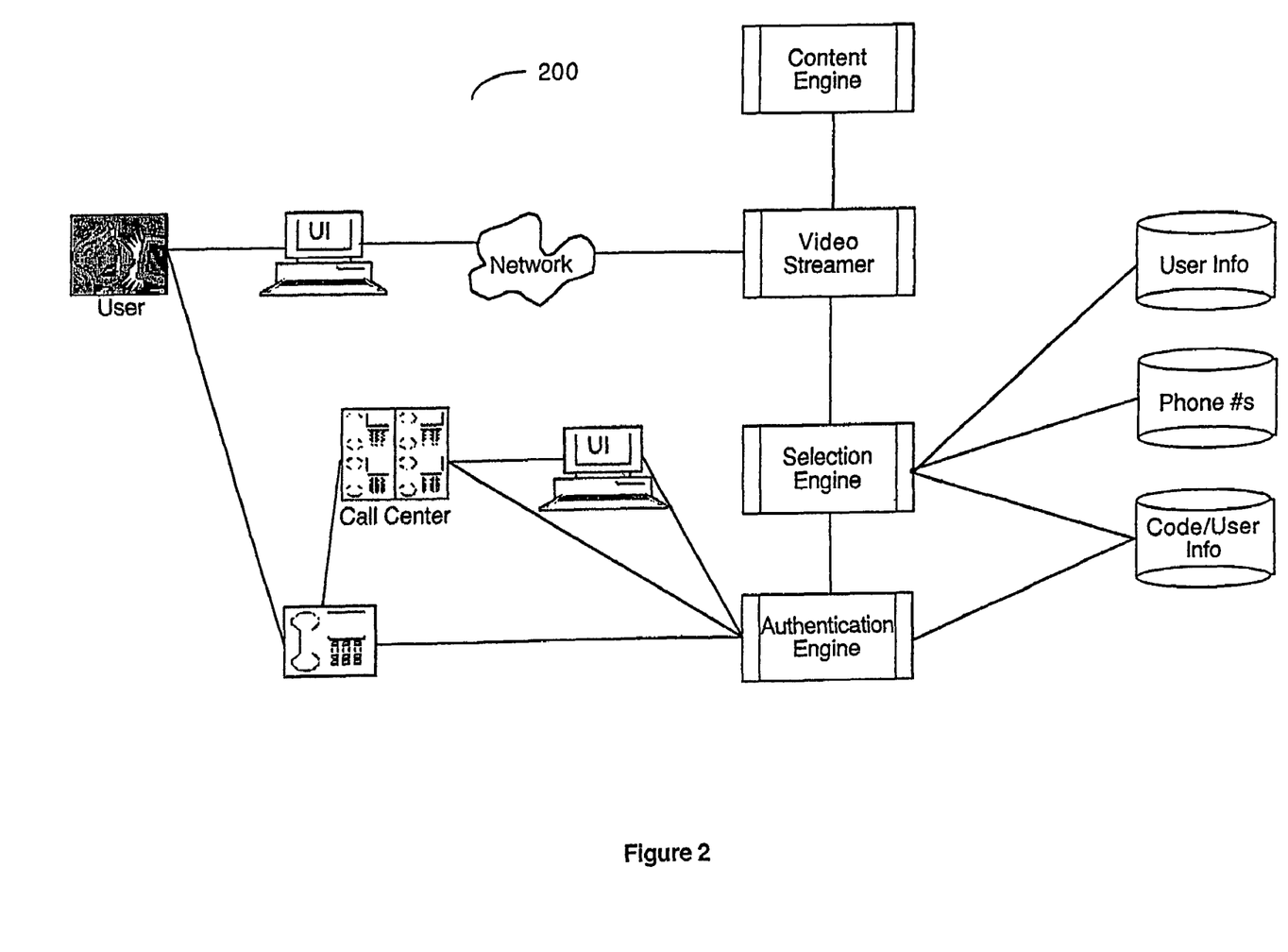
FIG. 2 is an illustrative embodiment of components of an authentication system in accordance with one embodiment of the present invention.

FIG. 2 illustrates an embodiment of a system that may perform user authentication according to one embodiment of the invention. A central processor in the shown system may perform authentication functions performed by an authentication engine. The authentication engine may perform several functions. In process 100 shown in FIG. 1, the first function the authentication engine may perform is to instruct the selection engine to choose a new phone number from the data structure maintaining or storing a set (or bank) of phone numbers. For instance, the phone number may be randomly-selected from the bank.

The selection engine may then send the selected phone number to an authentication engine which may then perform a function of activating the selected phone number. Other functions performed by the authentication engine may include answering the phone when the proper phone number is called by the user, prompting the user for his or her random code, comparing the code to the data stored in the data structure containing the code/user information, and determining the user from the code/user information data structure and therefore authenticating the user.

Rather than communicating directly with the user by telephone, the authentication engine may additionally accept the information through a call center. For example, the call center may pass the phone number called and the code given by the user to the authentication engine, and the call center may employ the user interface. The authentication engine may also deactivate the randomly selected phone number at an appropriate time.

In addition to choosing the random phone number, the selection engine also may select the random code assigned to each user and store each code/user combination in a data structure. The selection engine may also erase the code/user information in the data structure when instructed by the authentication engine prior to generating a new set of code/user combinations.

The list of users requiring random codes may be obtained by the selection engine from a number of sources including a user data structure that may include the user identities, user names and active times. Such a data structure may be part of a computer system for operating a game, interactive television show or any program requiring user feedback or interaction.

The selection engine may also send the randomly selected phone number and the code/user information to a video streamer. The video streamer may then insert the selected phone number and the code into the video stream provided by the content engine. The information from the selection engine may be inserted as a portion of the total video stream and streamed for a only a few frames or continuously. Information may also be inserted only as a full page shown for a few frames before the video stream from the content engine continues. The content engine may be part of a much larger system for providing video content including television networks, cable systems or game programs.

The video streamer may also send the video stream to a user interface over a direct line or a network to a user interface that a user is employing. If the user interface is rendered through an interactive television system using a set top box, the set top box associated with the system may then only display the proper code for its user. In one example, each set top box may have an address card that may be programmed into the video stream that allows only the correct set top box to display the selected random code for that particular user. Similar addressing may be possible with other viewing systems or the video streamer may be able to send only the selected random code for each user.

An alternative system for generating the code for each user includes a selection engine that generates a specific algorithm using unique information for each user, such as a system user identification information. Based on this information, a computer process executing this algorithm may then generate the code. The algorithm may be passed from the selection engine to the authentication engine and to the video streamer for transmitting to the user interface. The user interface may then have a program that operates the algorithm on the unique information for the user that was previously entered into it by the user or system.

The above is merely an illustrative embodiment of an authentication system. Such an illustrative embodiment is not intended to limit the scope of the invention, as any of numerous other implementations of an authentication system, for example, variations of the means that a user uses for accessing the authentication engine, are possible and are intended to fall within the scope of the invention. None of the claims set forth below are intended to be limited to any particular implementation of an authentication system unless such claim includes a limitation explicitly reciting a particular implementation.

System 200, and components thereof such as the payment, payout and game engines, may be implemented using software (e.g., C, C#, C++, Java, or a combination thereof), hardware (e.g., one or more application-specific integrated circuits), firmware (e.g., electrically-programmed memory) or any combination thereof. One or more of the components of 200 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 200, each of the components may reside in one or more locations on the system. For example, different portions of the components of 200 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 200 may be implemented on a computer system described below in relation to FIGS. 3 and 4.

It should be appreciated that system 200 is merely an illustrative embodiment of the game system. Such an illustrative embodiment is not intended to limit the scope of the invention, as any of numerous other implementations of the authentication system, for example, variations of 200, are possible and are intended to fall within the scope of the invention. For example, a parallel system for displaying by interactive television may add additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described authentication functions including but not limited to selecting the random phone number, generating user specific random codes, displaying the selected phone number and codes, activating a phone number, answering the phone and matching the user entered code with the user. It should be appreciated that the system may perform other functions, including network communication, and the invention is not limited to having any particular function or set of functions.

Figure 3:
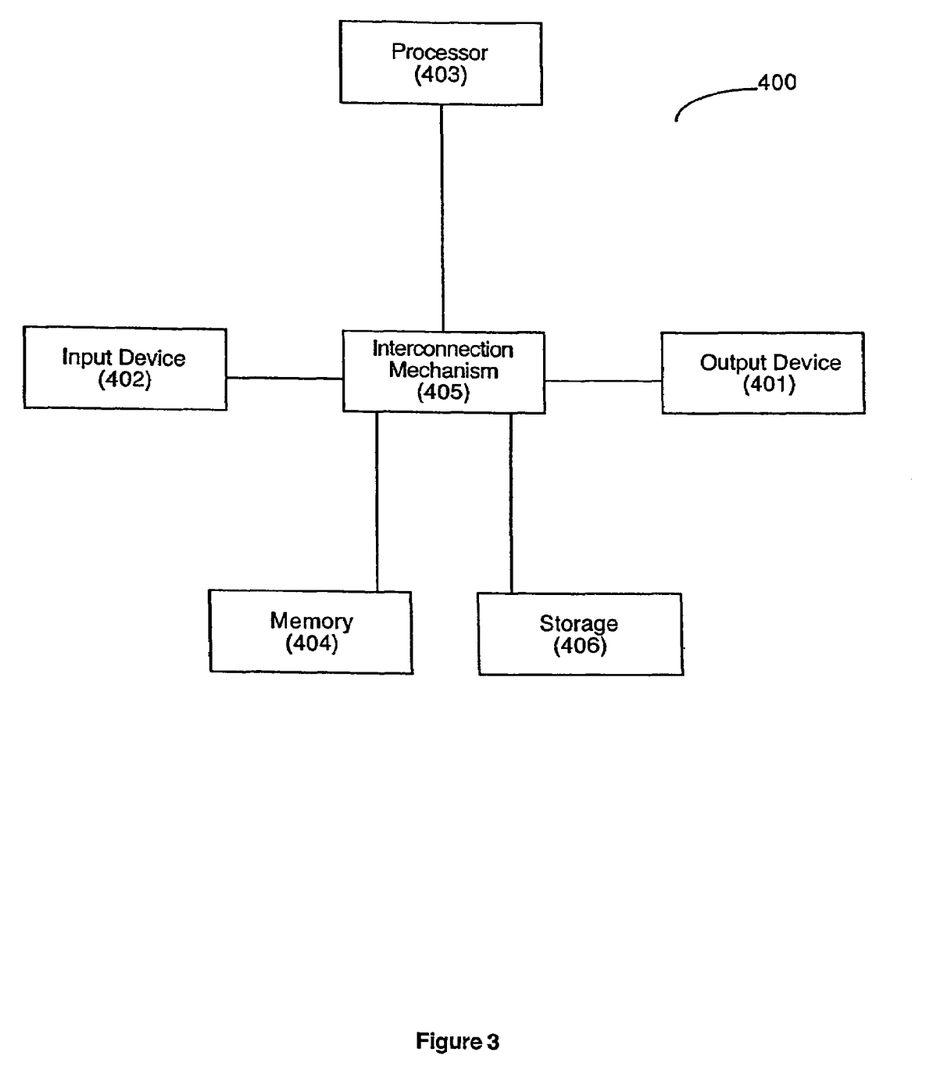
FIG. 3 is an illustrative embodiment of a general-purpose computer system upon which various aspects of the present invention may be implemented.

For example, various aspects of the invention may be implemented as specialized software executing in a general-purpose computer system 400 such as that shown in FIG. 3. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405.

Figure 4:
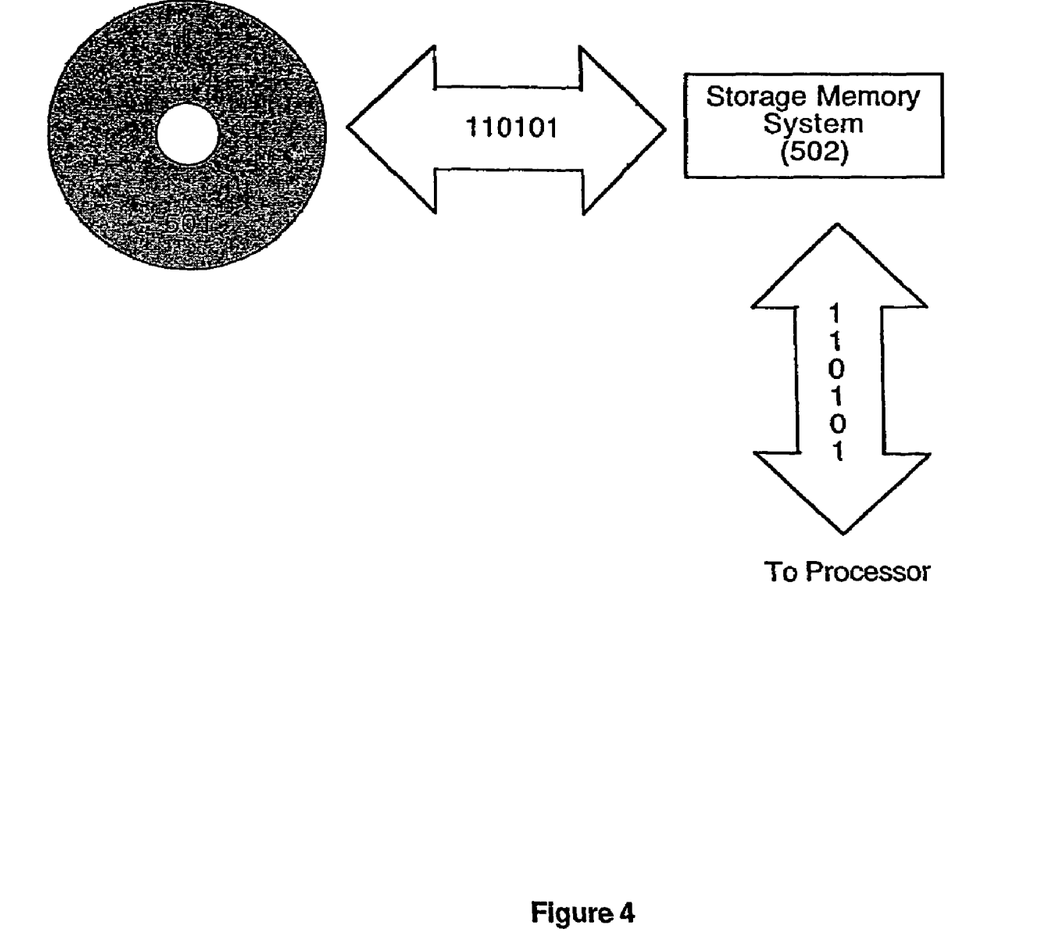
FIG. 4 is an illustrative embodiment of a computer data storage system that may be used in conjunction with various aspects of the present invention.

The storage system 406, shown in greater detail in FIG. 4, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 3. Various aspects of the invention may be practiced on one or more computers having a different architecture or components that that shown in FIG. 3.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for authenticating the identity of an individual at a remote viewing terminal, the method comprising acts of:
   conducting an interactive game played by the individual on the remote viewing terminal with a central computer system;
   selecting a phone number;
   generating, using information associated with the individual, an authentication code for the individual;
   displaying the selected phone number to the individual on the remote viewing terminal;
   displaying the authentication code to the individual on the remote viewing terminal; and
   authenticating the individual upon receipt of the authentication code via a call made by the individual to the selected phone number.

2. The method according to claim 1, wherein the act of displaying the selected phone number includes displaying the selected phone number upon an occurrence of an activating event.

3. The method according to claim 2, wherein the activating event is a determination that the individual has won the game.

4. The method according to claim 1, further comprising an act of maintaining the selected phone number as an active number for a period of time.

5. The method according to claim 4, wherein the period of time is a time period of one game.

6. The method according to claim 4, wherein the period of time is a fixed period of time.

7. The method according to claim 4, wherein the period of time is a variable period of time.

8. The method according to claim 4, wherein the period of time allows for the individual to be authenticated.

9. The method according to claim 4, further comprising an act of disabling the selected phone number after the period of time.

10. The method according to claim 4, wherein the selected phone number is a toll-free number.

11. The method according to claim 1, wherein the act of displaying the selected phone number includes an act of displaying the selected phone number on one or more remote viewing terminals.

12. The method according to claim 1, wherein the act of displaying the selected phone number includes an act of displaying the selected phone number only at one remote viewing terminal.

13. The method according to claim 1, wherein the selected phone number is selected from a predetermined set of phone numbers.

14. The method according to claim 1, further comprising an act of displaying a randomly-generated code to the individual viewing the viewing terminal.

15. The method according to claim 14, wherein a different randomly-generated code is displayed to each individual viewing on a remote viewing terminal.

16. The method according to claim 14, wherein the randomly-generated code is active for a selected short time interval.

17. The method according to claim 1, further comprising an act of prompting the individual to enter a code.

18. The method according to claim 17, further comprising acts of accepting the code from the individual and comparing the accepted code with a code displayed to the individual at the viewing terminal after calling the selected phone number.

19. The method according to claim 1, further comprising an act of determining whether the individual is a winner.

20. The method according to claim 19, further comprising an act of notifying the individual if he or she is determined as a winner.

21. A method for authenticating the identity of an individual at a remote viewing terminal, comprising acts of:
   conducting an interactive game played by the individual on the remote view terminal with a central computer system;
   generating, using information associated with the individual, an authentication code for the individual;

displaying a randomly-selected Internet site locator to the individual on the remote viewing terminal;
displaying the authentication code to the individual on the remote viewing terminal; and
authenticating the individual upon receipt of the authentication code via the randomly-selected Internet site.

22. The method according to claim 21, further comprising an act of maintaining the randomly-selected Internet site locator as an active locator for a period of time.

23. The method according to claim 22, wherein the period of time is a time period of one game.

24. The method according to claim 22, wherein the period of time is a variable period of time.

25. The method according to claim 22, wherein the period of time is a fixed period of time.

26. The method according to claim 22, wherein the period of time allows for the individual to be authenticated.

27. The method according to claim 22, further comprising an act of disabling the randomly-selected Internet site locator after the period of time.

28. The method according to claim 21, wherein the act of displaying the randomly-selected Internet site locator includes an act of displaying the randomly-selected site locator on one or more remote viewing terminals.

29. The method according to claim 21, wherein the act of displaying the randomly-selected Internet site locator includes an act of displaying the randomly-selected Internet site locator only at one remote viewing terminal.

30. The method according to claim 21, wherein the randomly-selected Internet site locator is selected from a predetermined set of Internet site locators.

31. The method according to claim 21, wherein the randomly-selected Internet site locator is randomly-generated.

32. The method according to claim 21, further comprising an act of displaying a randomly-generated code to the individual viewing the viewing terminal.

33. The method according to claim 32, wherein the randomly-generated code is active for a selected short time interval.

34. The method according to claim 21, further comprising an act of prompting the individual to enter a code.

35. The method according to claim 34, further comprising acts of accepting the code from the individual and comparing the code with a code displayed to the individual at the viewing terminal after accessing the randomly-selected Internet site.

36. The method according to claim 21, wherein the activating event is a determination that the individual has won the game.

37. The method according to claim 21, further comprising an act of determining whether the individual is a winner.

38. The method according to claim 37, further comprising an act of notifying the individual if he or she is determined as a winner.

39. The method according to claim 21, wherein the randomly-selected Internet site is displayed on one or more of the remote viewing terminals.

40. A computer-readable medium having instructions stored thereon that when executed by a computer, perform a method for authenticating the identity of an individual at a remote viewing terminal, the method comprising acts of:
selecting a phone number;
generating, using information associated with the individual, an authentication code for the individual;
conducting an interactive game played by the individual on the remote viewing terminal with a central computer system;
displaying the selected phone number to the individual on the remote viewing terminal;
displaying the authentication code to the individual on the remote viewing terminal; and
authenticating the individual upon receipt of the authentication code via a call made by the individual to the selected phone number.

41. The computer-readable medium according to claim 40, wherein the act of displaying the selected phone number includes displaying the selected phone number upon an occurrence of activating event.

42. The computer-readable medium according to claim 41, wherein the activating event is a determination that the individual has won the game.

43. The computer-readable medium according to claim 40, wherein the method further comprises an act of maintaining the selected phone number as an active number for a period of time.

44. The computer-readable medium according to claim 43, wherein the period of time is a time period of one game.

45. The computer-readable medium according to claim 43, wherein the period of time is a fixed period of time.

46. The computer-readable medium according to claim 43, wherein the period of time is a variable period of time.

47. The computer-readable medium according to claim 43, wherein the period of time allows for the individual to be authenticated.

48. The computer-readable medium according to claim 43, wherein the method further comprises an act of disabling the selected phone number after the period of time.

49. The computer-readable medium according to claim 43, wherein the selected phone number is a toll-free number.

50. The computer-readable medium according to claim 40, wherein the act of displaying the selected phone number includes an act of displaying the selected phone number on one or more remote viewing terminals.

51. The computer-readable medium according to claim 40, wherein the act of displaying the selected phone number includes an act of displaying the selected phone number only at one remote viewing terminal.

52. The computer-readable medium according to claim 40, wherein the selected phone number is selected from a predetermined set of phone numbers.

53. The computer-readable medium according to claim 40, wherein the method further comprises an act of displaying a randomly-generated code to the individual viewing the viewing terminal.

54. The computer-readable medium according to claim 53, wherein a different randomly-generated code is displayed to each individual viewing on a remote viewing terminal.

55. The computer-readable medium according to claim 53, wherein the randomly-generated code is active for a selected short time interval.

56. The computer-readable medium according to claim 40, wherein the method further comprises an act of prompting the individual to enter a code.

57. The computer-readable medium according to claim 56, wherein the method further comprises acts of accepting the code from the individual and comparing the accepted code with a code displayed to the individual at the viewing terminal after calling the selected phone number.

58. The computer-readable medium according to claim 40, wherein the method further comprises an act of determining whether the individual is a winner.

59. The computer-readable medium according to claim 58, wherein the method further comprises an act of notifying the individual if he or she is determined as a winner.

60. A computer readable medium having instructions stored thereon that when executed perform a method for authenticating the identity of an individual at a remote viewing terminal, the method comprising acts of:
- conducting an interactive game played by the individual on the remote view terminal with a central computer system;
- generating, using information associated with the individual, an authentication code for the individual;
- displaying a randomly-selected Internet site locator to the individual on the remote viewing terminal;
- displaying the authentication code to the individual on the remote viewing terminal; and
- authenticating the individual upon receipt of the authentication code via the randomly-selected Internet site.

61. The computer-readable medium according to claim 60, wherein the method further comprises an act of maintaining the randomly-selected Internet site locator as an active locator for a period of time.

62. The computer-readable medium according to claim 61, wherein the period of time is a time period of one game.

63. The computer-readable medium according to claim 61, wherein the period of time is a variable period of time.

64. The computer-readable medium according to claim 61, wherein the period of time is a fixed period of time.

65. The computer-readable medium according to claim 61, wherein the period of time allows for the individual to be authenticated.

66. The computer-readable medium according to claim 61, wherein the method further comprises an act of disabling the randomly-selected Internet site locator after the period of time.

67. The computer-readable medium according to claim 60, wherein the act of displaying the randomly-selected Internet site locator includes an act of displaying the randomly-selected site locator on one or more remote viewing terminals.

68. The computer-readable medium according to claim 60, wherein the act of displaying the randomly-selected Internet site locator includes an act of displaying the randomly-selected Internet site locator only at one remote viewing terminal.

69. The computer-readable medium according to claim 60, wherein the randomly-selected Internet site locator is selected from a predetermined set of Internet site locators.

70. The computer-readable medium according to claim 60, wherein the randomly-selected Internet site locator is randomly-generated.

71. The computer-readable medium according to claim 60, wherein the method further comprises an act of displaying a randomly-generated code to the individual viewing the viewing terminal.

72. The computer-readable medium according to claim 71, wherein the randomly-generated code is active for a selected short time interval.

73. The computer-readable medium according to claim 60, wherein the method further comprises an act of prompting the individual to enter a code.

74. The computer-readable medium according to claim 73, wherein the method further comprises acts of accepting the code from the individual and comparing the code with a code displayed to the individual at the viewing terminal after accessing the randomly-selected Internet site.

75. The computer readable medium according to claim 60, wherein the activating event is a determination that the individual has won the game.

76. The computer-readable medium according to claim 60, wherein the method further comprises an act of determining whether the individual is a winner.

77. The computer-readable medium according to claim 76, wherein the method further comprises an act of notifying the individual if he or she is determined as a winner.

78. The computer-readable medium according to claim 60, wherein the randomly-selected Internet site is displayed on one or more of the remote viewing terminals.

79. A system for authenticating the identity of an individual, the system comprising:
- a selector that selects a phone number;
- a generator that generates, using information associated with the individual, an authentication code for the individual;
- a display adapted to display the selected phone number to the individual and to display the authentication code to the individual;
- a means for conducting an interactive game played by the individual at a remote viewing terminal including the display, the game being played with a central computer system; and
- an authenticator adapted to authenticate the individual upon receipt of the authentication code via a call made by the individual to the selected phone number.

80. The system according to claim 79, wherein the display is adapted to display the selected phone number upon an occurrence of activating event.

81. The system according to claim 80, wherein the activating event is a determination that the individual has won the game.

82. The system according to claim 79, wherein the system comprises means for maintaining the selected phone number as an active number for a period of time.

83. The system according to claim 82, wherein the period of time is a time period of one game.

84. The system according to claim 82, wherein the period of time is a fixed period of time.

85. The system according to claim 82, wherein the period of time is a variable period of time.

86. The system according to claim 82, wherein the period of time allows for the authenticator to authenticate the individual.

87. The system according to claim 82, wherein the selector is adapted to disable the selected phone number after the period of time.

88. The system according to claim 82, wherein the selected phone number is a toll-free number.

89. The system according to claim 79, wherein the display is part of a remote viewing terminal.

90. The system according to claim 79, wherein the selector is adapted to select the selected phone number from a predetermined set of phone numbers.

91. The system according to claim 79, wherein the display is adapted to display a randomly-generated code to the individual viewing the display.

92. The system according to claim 91, wherein the display is adapted to display a different randomly-generated code to each individual viewing the display.

93. The system according to claim 91, wherein the randomly-generated code is active for a selected short time interval.

94. The system according to claim 79, further comprising means for prompting the individual to enter a code.

95. The system according to claim 94, further comprising means for accepting the code from the individual and means for comparing the accepted code with a code displayed to the individual on the display after calling the selected phone number.

96. The system according to claim 79, further comprising means for determining whether the individual is a winner.

97. The system according to claim 96, further comprising means for notifying the individual if he or she is determined as a winner.

98. A system for authenticating the identity of an individual, comprising:
- a means for conducting an interactive game played by the individual on one remote viewing terminal with a central computer system;
- a generator for generating, using information associated with the individual, an authentication code for the individual;
- a display adapted to display a randomly-selected Internet site locator to the individual and to display the authentication code to the individual; and
- an authenticator adapted to authenticate the individual upon receipt of the authentication code via the randomly-selected Internet site.

99. The system according to claim 98, further comprising means for maintaining the randomly-selected Internet site locator as an active locator for a period of time.

100. The system according to claim 99, wherein the period of time is a time period of one game.

101. The system according to claim 99, wherein the period of time is a variable period of time.

102. The system according to claim 99, wherein the period of time is a fixed period of time.

103. The system according to claim 99, wherein the period of time allows for the individual to be authenticated.

104. The system according to claim 99, further comprising means for disabling the randomly-selected Internet site locator after the period of time.

105. The system according to claim 98, wherein the display is part of a remote viewing terminal.

106. The system according to claim 98, wherein the selector is adapted to select the site locator from a predetermined set of Internet site locators.

107. The system according to claim 98, wherein the randomly-selected Internet site locator is randomly-generated.

108. The system according to claim 98, wherein the display is adapted to display randomly-generated code to the individual viewing the display.

109. The system according to claim 108, wherein the randomly-generated code is active for a selected short time interval.

110. The system according to claim 98, further comprising means for prompting the individual to enter a code.

111. The system according to claim 110, further comprising means for accepting the code from the individual and means for comparing the code with a code displayed to the individual after accessing the randomly-selected Internet site.

112. The system according to claim 98, wherein the activating event is a determination that the individual has won the game.

113. The system according to claim 98, further comprising means for determining whether the individual is a winner.

114. The system according to claim 113, further comprising means for notifying the individual if he or she is determined as a winner.

115. The method according to claim 98, wherein the randomly-selected Internet site is displayed on one or more remote viewing terminals.

* * * * *

UNITED STATES PATENT AND TRADEMARK OFFICE
CERTIFICATE OF CORRECTION

| | | |
|---|---|---|
| PATENT NO. | : 7,623,844 B2 | Page 1 of 1 |
| APPLICATION NO. | : 10/793656 | |
| DATED | : November 24, 2009 | |
| INVENTOR(S) | : Herrmann et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 761 days.

Signed and Sealed this

Ninth Day of November, 2010

David J. Kappos
*Director of the United States Patent and Trademark Office*